United States Patent
Lindblom et al.

(10) Patent No.: US 10,566,878 B2
(45) Date of Patent: Feb. 18, 2020

(54) RADIATION HEAT TRANSFER OF INTERNAL MOTOR COMPONENTS BY ELECTRO-MAGNETIC WAVES

(71) Applicant: Rockwell Automation Technologies, Inc., Mayfield Heights, OH (US)

(72) Inventors: John S. Lindblom, Golden Valley, MN (US); Steven W. Larson, Minnetonka, MN (US)

(73) Assignee: Rockwell Automotion Technologies, Inc., Mayfield Heights, OH (US)

( * ) Notice: Subject to any disclaimer, the term of this patent is extended or adjusted under 35 U.S.C. 154(b) by 190 days.

(21) Appl. No.: 15/673,785

(22) Filed: Aug. 10, 2017

(65) Prior Publication Data
US 2017/0366072 A1 Dec. 21, 2017

Related U.S. Application Data

(63) Continuation of application No. 14/231,948, filed on Apr. 1, 2014, now Pat. No. 9,762,107.

(51) Int. Cl.
*H02K 5/02* (2006.01)
*H02K 9/22* (2006.01)
*C25D 11/14* (2006.01)
*H02K 11/21* (2016.01)

(52) U.S. Cl.
CPC ............... *H02K 9/22* (2013.01); *C25D 11/14* (2013.01); *H02K 5/02* (2013.01); *H02K 11/21* (2016.01)

(58) Field of Classification Search
CPC .......... C25D 11/14; H02K 11/21; H02K 5/02; H02K 9/22
See application file for complete search history.

(56) References Cited

U.S. PATENT DOCUMENTS

| 4,293,785 | A | * | 10/1981 | Jackson, Jr. | F28F 13/18 165/133 |
| 5,831,358 | A | * | 11/1998 | Bobay | H02K 7/04 310/58 |
| 5,932,942 | A | * | 8/1999 | Patyk | H02K 11/33 310/58 |

(Continued)

FOREIGN PATENT DOCUMENTS

| EP | 0 612 205 A1 | 8/1994 |
| EP | 0 905 862 A2 | 3/1999 |

(Continued)

OTHER PUBLICATIONS

Chinese Search Report dated Jan. 9, 2017 in connection with Application No. 201510151767.9.

(Continued)

*Primary Examiner* — Naishadh N Desai
(74) *Attorney, Agent, or Firm* — Fay Sharpe LLP

(57) ABSTRACT

A motor assembly including a housing with a motor portion having an opening for receiving a motor housing/stator assembly, rotor assembly, front and rear end caps and bearings, an encoder coupled to the motor, and an rear cover for enclosing the opening of the motor portion of the housing, the rear cover at least partially surrounding the encoder. At least one of an interior surface of the rear cover or an exterior surface of the encoder comprise a material having an emissivity greater than 0.9.

19 Claims, 4 Drawing Sheets

(56) References Cited

U.S. PATENT DOCUMENTS

| | | | | |
|---|---|---|---|---|
| 5,939,807 A | * | 8/1999 | Patyk | H02K 5/161 310/64 |
| 6,078,117 A | * | 6/2000 | Perrin | H01R 13/719 310/68 R |
| 6,300,693 B1 | * | 10/2001 | Poag | H02K 5/20 310/54 |
| 2014/0077630 A1 | * | 3/2014 | Jiang | H02K 11/21 310/52 |

FOREIGN PATENT DOCUMENTS

| | | | |
|---|---|---|---|
| GB | 2 184 610 A | 6/1987 | |
| GB | 2184610 A | * 6/1987 | ............. H02K 5/145 |

OTHER PUBLICATIONS

European Search Report completed Apr. 27, 2016 in connection with Application No. EP 15 16 1861.

Boglietti, Aldo et al. "TEFC Induction Motors Thermal Models: A Parameter Sensitivity Analysis", IEEE Transactions on Industry Applications, IEEE Service Center, Piscataway, NJ, US, Aldo Boglietti, et al., vol. 41, No. 3, May 1, 2005, pp. 756-763.

Office Action (with translation) dated Oct. 12, 2019 in connection with CN 201710909450.6.

* cited by examiner

RADIATION HEAT TRANSFER OF INTERNAL MOTOR COMPONENTS BY ELECTRO-MAGNETIC WAVES

CROSS REFERENCE TO RELATED APPLICATION

This application is a continuation of co-pending U.S. patent application Ser. No. 14/231,948, filed Apr. 1, 2014, and the entire disclosure of said prior application is hereby expressly incorporated by reference into the present specification.

BACKGROUND

The present exemplary embodiment relates to radiation heat transfer. It finds particular application in conjunction with radiation heat transfer of electric motor components, and will be described with particular reference thereto. However, it is to be appreciated that the present exemplary embodiment is also amenable to other like applications.

Electric motors commonly include certain electronic devices mounted or supported in a common housing with the rotating elements of the electric motor. Examples of such electronic devices include switching devices, resistors, encoders, etc. It is well known that such electronic devices generally have a limited operating temperature range and that heat generated by the electric motor and/or the electronics themselves can result in unfavorable operating environments. If the thermal issues are not addressed, the electronic components may overheat and malfunction, or fail altogether.

In some applications, motor output can be limited by thermal issues. For example, a motor with an encoder may experience increased temperatures when operating at high RPMs. This can be due to increased heat generated by the motor, as well as self-heating of the encoder as it spins at high speeds. Current practice is to reduce torque output of a motor when operating at the higher RPMs in order to reduce heat output and thereby maintain the encoder at a suitable operating temperature. Such an approach is less than ideal since it prevents a motor from being used at full capacity, or requires the use of a larger motor than would otherwise be necessary for a given application.

Other approaches have also been developed for addressing thermal issues. For example, fans have been provided for circulating air around a motor housing to remove excess heat therefrom. While effective, fans increase cost and require additional space. Another approach has been to provide externally mounted heat sinks that are designed to transfer heat from the motor to an exterior of the motor housing, thus lowering the temperature within the motor housing. Again, such an approach generally requires additional space. Still another approach has been the provision of liquid cooling systems. The cost of such systems, however, is generally very high and designing a system with suitable performance for an electric motor is fairly complicated.

BRIEF DESCRIPTION

In accordance with one aspect, a motor assembly comprises a housing including a motor portion having an opening for receiving a motor, a motor received in the housing, an encoder coupled to the motor, and an end cap for enclosing the opening of the motor portion of the housing, the end cap at least partially surrounding the encoder. At least one of an interior surface of the end cap or an exterior surface of the encoder comprise a material having an emissivity greater than 0.9.

The end cap can be aluminum, steel, or stainless steel, for example, and the interior surface of the end cap can be anodized black. The interior surface of the end cap can be painted black. Both the encoder and the interior surface of the end cap can be anodized black. Both the encoder and the interior surface of the end cap can be painted or otherwise colored black. Only the encoder can be painted or otherwise colored black. The motor assembly can be a food-grade motor assembly having an exterior of the housing painted white with a paint system meets the United States Department of Agriculture Food Safety and Inspection Service requirements for incidental, indirect food contact.

In accordance with another aspect, an end cap for a motor assembly comprises a body having an interior surface and an exterior surface, wherein the exterior surface is painted white, and wherein the interior surface has an emissivity greater than 0.9. The interior surface can be painted black. The body can be aluminum, steel, or stainless steel, and the interior surface can be anodized black, or the interior and exterior (non-food grade) surfaces of the body can be anodized black, and/or the exterior anodized black surface can be painted white. The exterior surfaces can be dyed or tinted white.

In accordance with another aspect, a method of increasing heat transfer in a motor assembly comprises providing a motor component, providing a motor housing for receiving the motor component, and increasing the emissivity of at least one of the motor component or an interior surface of the motor housing by applying a coating, wherein the emissivity is increased to at least 0.9. The increasing the emissivity can include painting with black paint, and/or black anodizing, or blackening the interior surfaces in any manner such as dyeing or tinting.

DETAILED DESCRIPTION

Motors used in certain applications, such as food processing (e.g., food grade motors), typically have an aluminum housing that is typically painted white on the outside per government regulations. In contrast, motors used outside of such applications are generally black. It has been found that, for a given motor, painting the outside of its housing white results in less radiation heat transfer from the housing exterior surface to ambient. This increases interior motor component temperatures and results in a significant decrease in motor performance.

In accordance with the present disclosure, interior surfaces of a motor are treated to increase radiational heat transfer from interior motor components to the exterior of the motor. In one exemplary embodiment, the interior surfaces of a motor housing and the encoder itself are painted and/or anodized black to increase the emissivity of the components and thereby increase radiational heat transfer from the encoder to the exterior of the motor.

Figure 1:
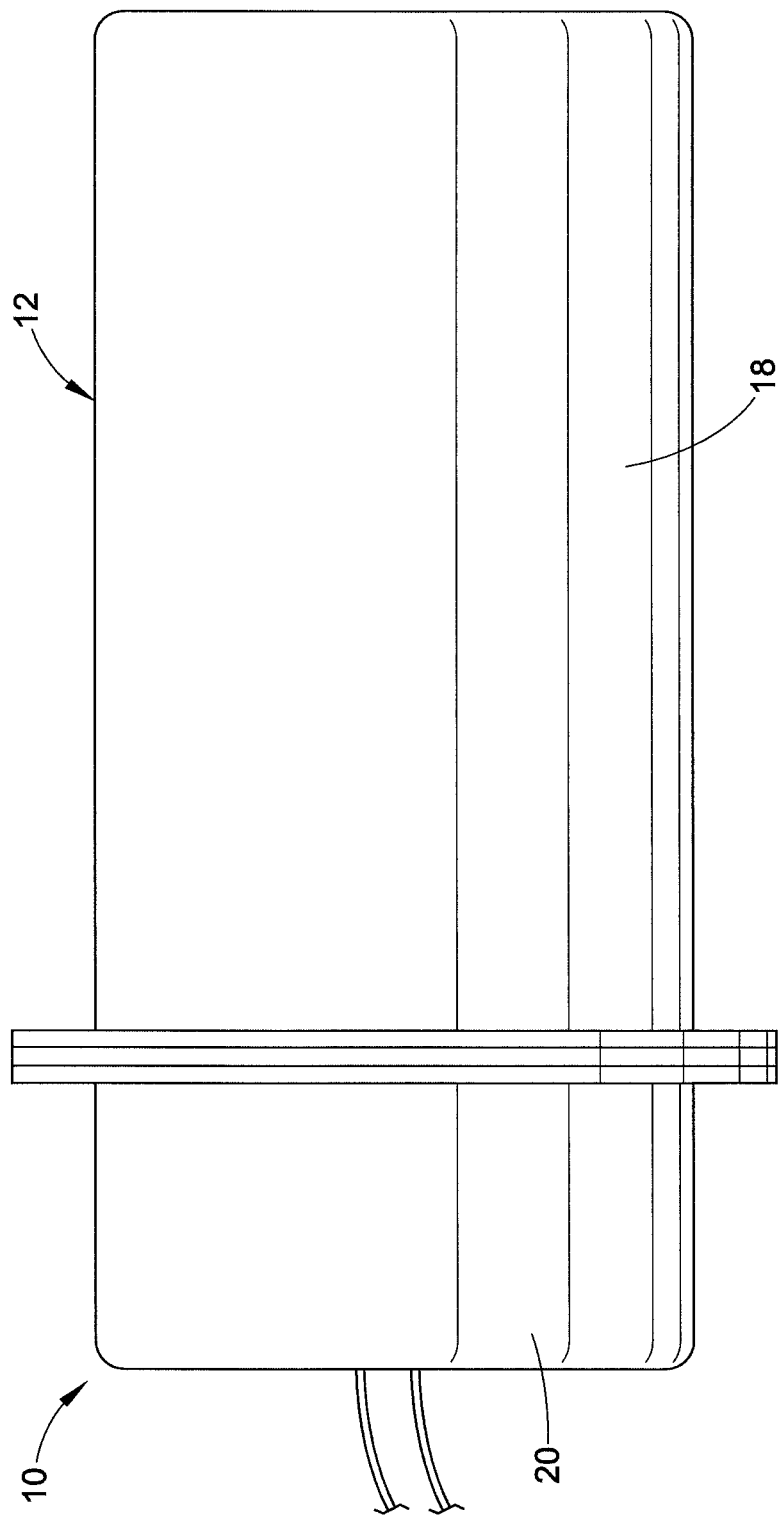
FIG. 1 is a side view of an exemplary electric motor assembly in accordance with the present disclosure.
Figure 2:
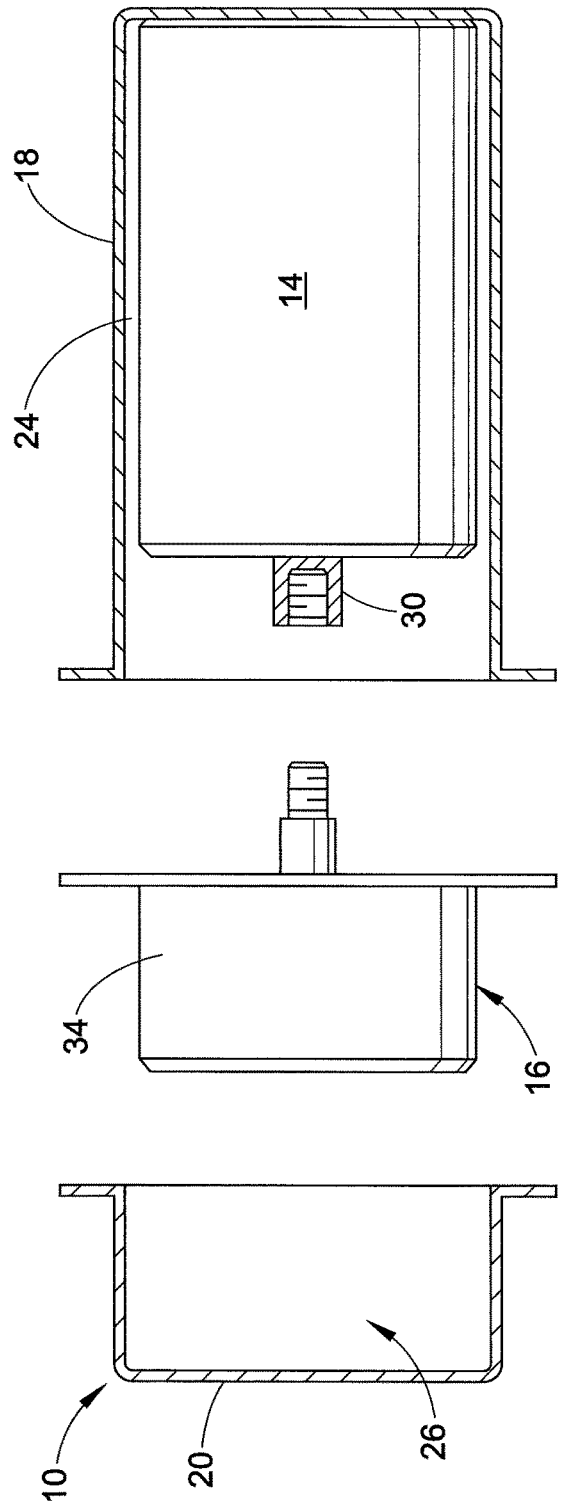
FIG. 2 is an exploded view of the motor assembly of FIG. 1.
Figure 3:
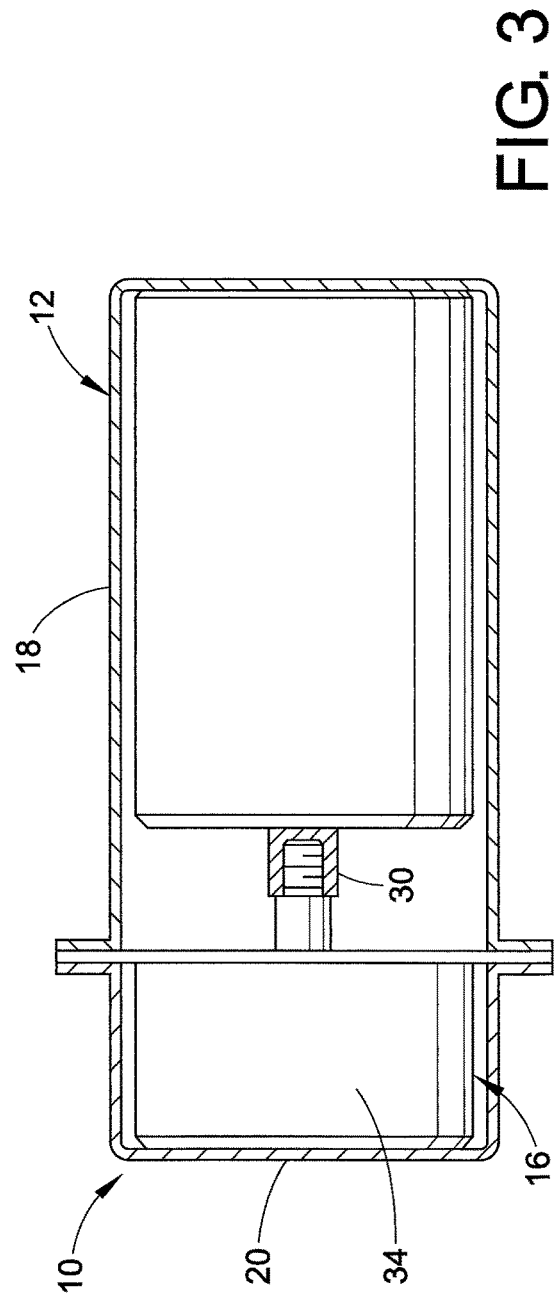
FIG. 3 is a partially cross-sectional view of the motor assembly of FIG. 1.

With reference to FIGS. 1-3, an exemplary electric motor assembly in accordance with the present disclosure is illustrated and identified generally by reference numeral 10. The electric motor assembly generally comprises a housing 12 in which the internal motor components, including a rotor 14 and an encoder 16, are supported. The housing is comprised of two main components, a motor housing portion 18 and an encoder housing portion, referred to herein as an end cap or a rear cover 20. The motor housing portion 18 includes a motor compartment or cavity 24 in which the rotor 14 (and stator) is supported, and the rear cover 20 defines an encoder compartment or cavity 26 in which the encoder 16 is contained. The interior of the motor housing 12 and encoder compartment 26 are exemplary in nature, and other configurations are possible. For example, a single housing component can include both the motor housing and the encoder compartment.

As best seen in FIG. 3, the encoder 16 generally includes a cylindrical body 30 that houses electrical components. The encoder 16 is mounted axially coextensive with a portion of a shaft 30 of the motor rotor 14, and can be configured to sense both shaft RPM and angular position, as conventional. It will be appreciated that the encoder 16 is shown in schematic form in the drawings, and that the specific details of the encoder 16 is not germane to the present discussion.

In a typical motor assembly, both the encoder body 34 and the rear cover 20 that surrounds the encoder 16 are metal. In many applications, the encoder body 34 and end cap 20 are aluminum. The rear cover 20 can also be steel or stainless steel along with the motor housing. Bare aluminum, however, has poor radiation properties that limit the amount of radiational heat transfer from the interior of the motor to the ambient environment outside the motor housing.

Figure 4:
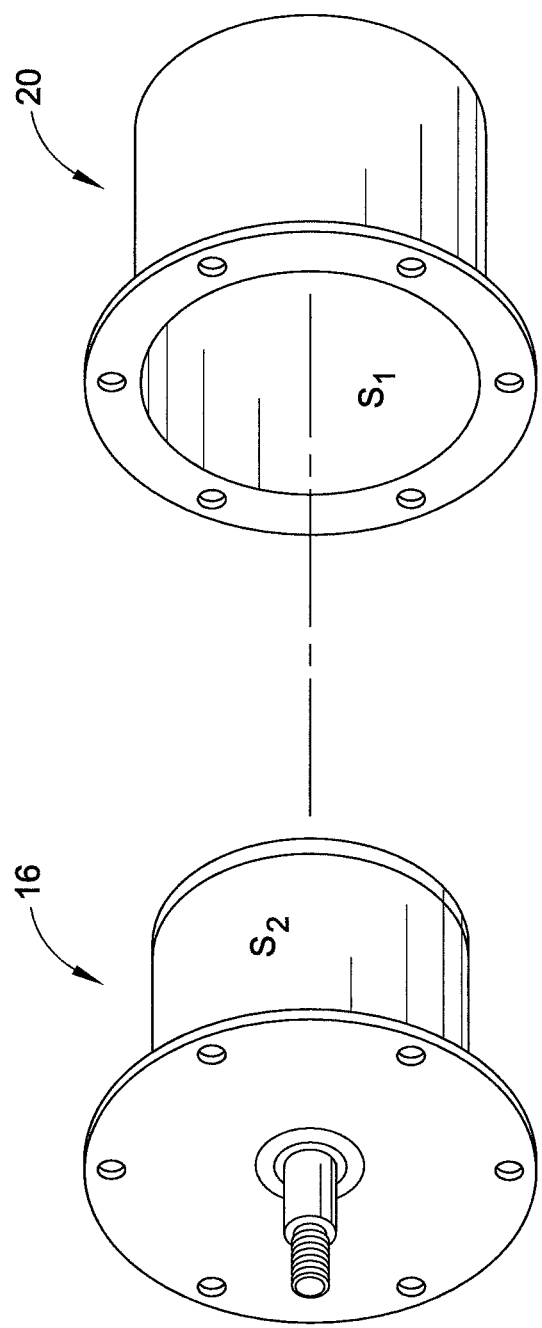
FIG. 4 is a perspective view of an end cap and encoder with treated surfaces in accordance with the present disclosure.

With reference to FIG. 4, and in accordance with the present disclosure, the interior surfaces of the motor 10 including the interior surface S1 of the end cap 20 and the outer surface S2 of the encoder body 34 are treated to increase emissivity and thereby increase the rate of heat transferred by radiation from the encoder to the ambient environment outside the housing. It will be appreciated that the term treated is intended to include, but is not limited to, painting, coating, plating, dyeing, tinting, or otherwise changing the surfaces to increase emissivity over a base emissivity of the bare, untreated material. For example, in one embodiment, the encoder body 34 is anodized black and the interior surface of the rear cover 20 is painted black. In another embodiment, both components can be anodized or painted, or both. In still another embodiment, the end cap is anodized black, or just the encoder exterior is black) As compared to bare aluminum with an emissivity of approximately 0.09, aluminum treated with a black coloring has an emissivity of approximately 0.9 to 0.95.

In the illustrated embodiment, the encoder and end cap are each cylindrical. Radiation exchange between cylindrical bodies is represented by the equation:

$$q = \frac{\sigma A_1 (T_1^4 - T_2^4)}{\frac{1}{\varepsilon_1} + \frac{A_1}{A_2}\left(\frac{1}{\varepsilon_2} - 1\right)}$$

Where $\sigma$=Stefan-Boltzmann=constant, and for a given geometry, A1 and A2 are constant.

For a given Temperature Delta (between Encoder and Cover), the Radiation Heat Transfer, q, simplifies to a function of Emissivities:

$$q \propto \frac{\text{constant}}{\frac{1}{\varepsilon_1} + \text{constant} \cdot \left(\frac{1}{\varepsilon_2} - 1\right)}$$

It will now be appreciated that, as encoder emissivity goes up, its reciprocal goes down, and heat transfer goes up; as rear cover emissivity goes up, its reciprocal goes down, and heat transfer goes up.

Testing has shown a substantial improvement in performance of the motor through such treatment of the internal components.

Example 1

Figure 5:
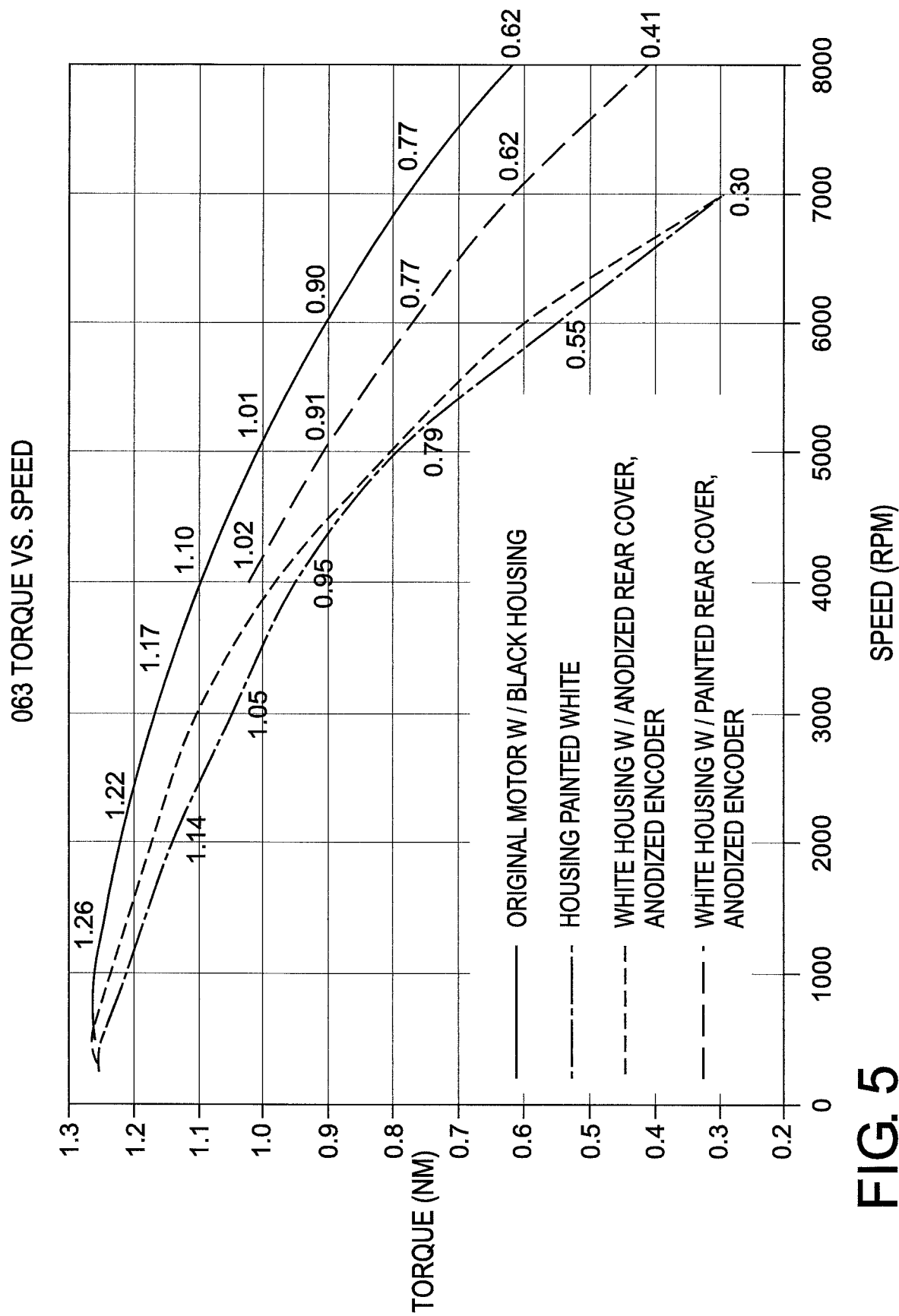
FIG. 5 is a graph representing torque vs speed for a test motor with various configurations represented.

In testing, one motor experienced an increase in internal temperature of 5.47 degrees C. as a result of the outside of the motor housing being painted white. As illustrated in the graph shown in FIG. 5, the performance of the original motor with black outer is represented by the uppermost line. After painting the outside of the housing white, the performance of the motor was degraded as shown by the lowermost line. In between the uppermost line and the lowermost lines are two lines representing improved performance based on treatment of the interior surface of the motor. In one test, the rear cover and the encoder were both anodized black. In another test, the rear cover was painted black, while the encoder was anodized black. Both configurations resulted in improved motor performance as illustrated in the graph. Additional testing was performed on other motor models with similar results.

It will be appreciated that increasing the emissivity of the encoder and or housing results in better heat dissipation. Accordingly, aspects of the present disclosure can be applied to housings having exterior colors other than white.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A motor assembly comprising:
a housing including a motor portion having an opening for receiving a motor;
a motor received in the housing;
an encoder coupled to the motor; and
an end cap secured to the housing and at least partially surrounding the encoder;
wherein at least one of an interior surface of the end cap and an exterior surface of the encoder comprise a material having an emissivity greater than 0.9; and
wherein an exterior of the housing includes a treatment that decreases the emissivity of the housing as compared to an emissivity of bare metal of which the motor housing is composed.

2. The motor assembly of claim 1, wherein the motor assembly is a food-grade motor assembly having an exterior of the housing painted white.

3. The motor assembly of claim 1, wherein the encoder includes a peripheral sidewall and an end wall for enclosing the opening of the motor portion of the housing, the peripheral sidewall of the end cap at least partially surrounding the encoder.

4. The motor assembly of claim 1, wherein the end cap is aluminum, and the interior surface of the end cap is anodized black.

5. The motor assembly of claim 1, wherein the interior surface of the end cap is painted black.

6. The motor assembly of claim 1, wherein both the encoder and the interior surface of the end cap are anodized black.

7. The motor assembly of claim 1, wherein both the encoder and the interior surface of the end cap are painted black.

8. The motor assembly of claim 1, wherein the encoder is painted black.

9. The motor assembly of claim 1, wherein the housing and end cap are aluminum, wherein the interior and exterior surfaces of the housing and end cap are anodized black, and wherein the anodized black exterior surfaces of the housing and end cap are painted white.

10. A method of increasing heat transfer in a motor assembly comprising:
providing a motor component;
providing a metal motor housing for receiving the motor component;
treating an exterior of the motor housing to cause a decrease in emissivity of the exterior of the motor housing as compared to an emissivity of bare metal of which the motor housing is composed; and
increasing the emissivity of at least one of the motor component or an interior surface of the motor housing;
wherein the emissivity is increased to at least 0.9.

11. The method of claim 10, wherein the increasing the emissivity includes painting with black paint.

12. The method of claim 11, wherein the increasing the emissivity includes black anodizing.

13. A motor assembly comprising a housing and a motor component received in the housing, wherein at least one of an interior surface of the housing and an exterior surface of the motor component comprise a material having an emissivity greater than 0.9, and wherein an exterior of the housing includes a treatment that decreases the emissivity of the housing as compared to an emissivity of bare metal of which the housing is composed.

14. The motor assembly of claim 13, wherein the motor assembly is a food-grade motor assembly having an exterior of the housing painted white.

15. The motor assembly of claim 13, wherein the housing is metal, and wherein the interior surface of the housing is anodized black.

16. The motor assembly of claim 13, wherein the interior surface of the housing is painted black.

17. The motor assembly of claim 13, wherein both the motor component and the interior surface of the housing are anodized black.

18. The motor assembly of claim 13, wherein both the motor component and the interior surface of the housing are painted black.

19. The motor assembly of claim 1, wherein the motor component is painted black.

* * * * *